July 28, 1970

M. C. MAGARIAN 3,521,818

CROP DUSTING MACHINE

Filed March 7, 1968

MASICK C. MAGARIAN
INVENTOR

ATTORNEY

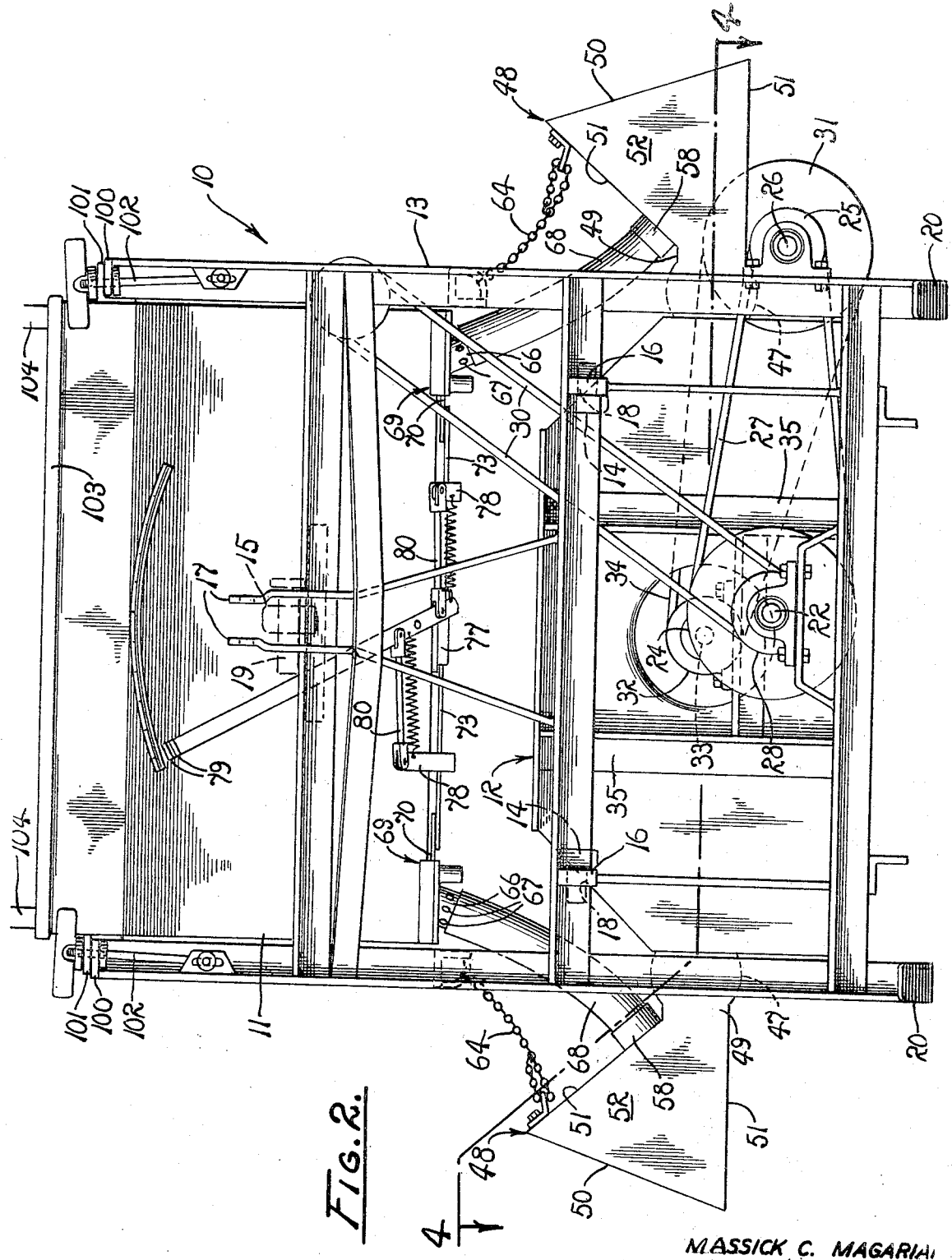

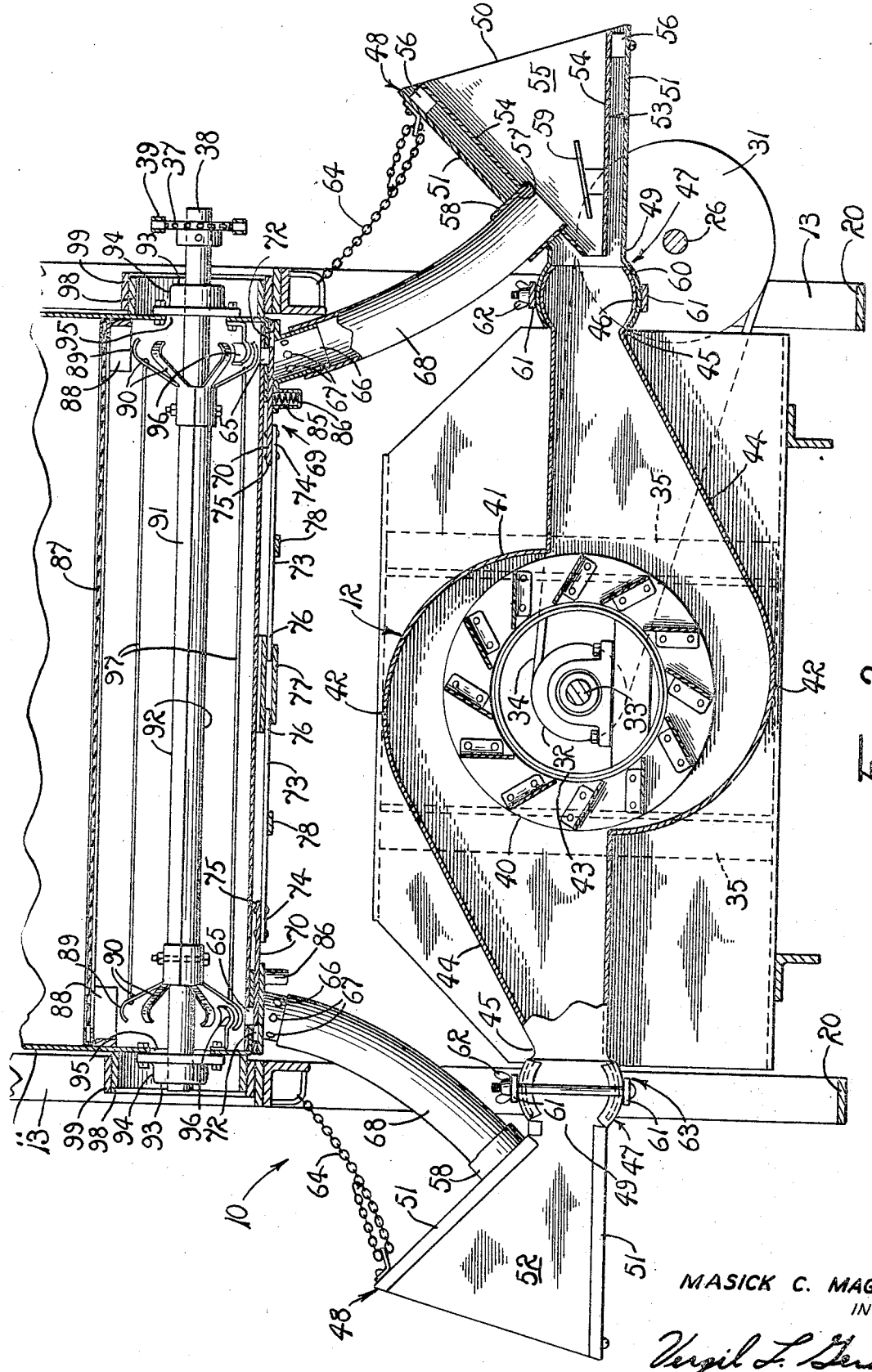

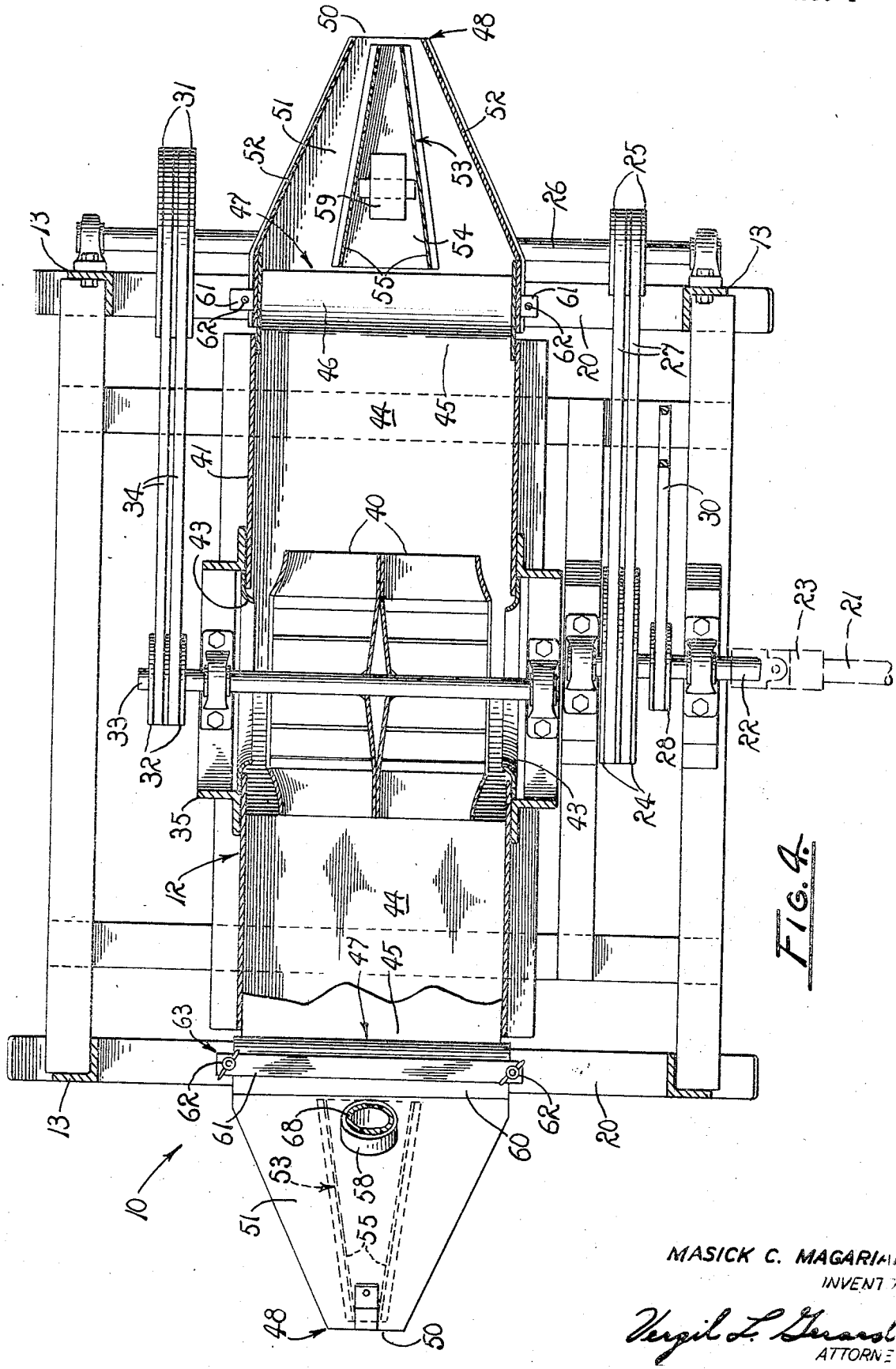

July 28, 1970   M. C. MAGARIAN   3,521,818
CROP DUSTING MACHINE
Filed March 7, 1968   5 Sheets-Sheet 5
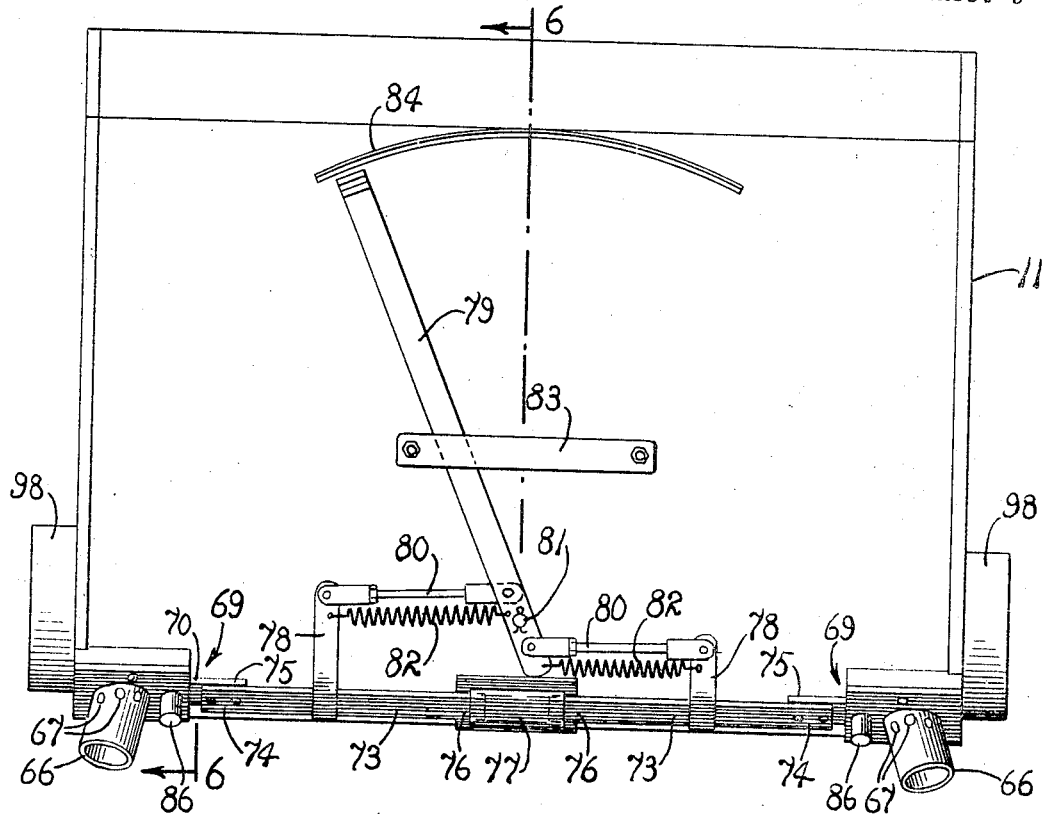
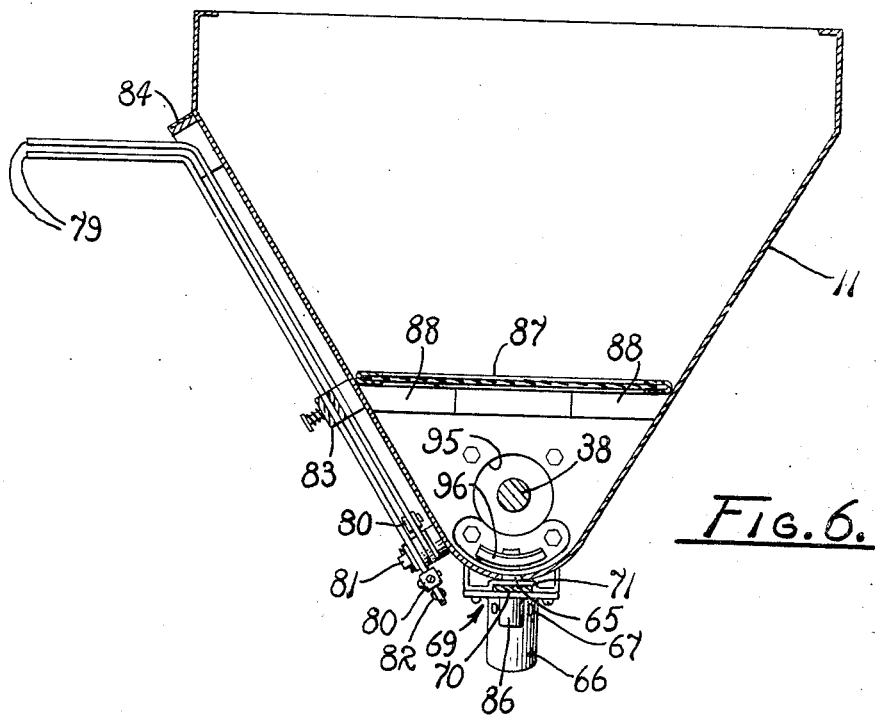
MASICK C. MAGARIAN
INVENTOR
Virgil L. Gerard
ATTORNEY United States Patent Office 3,521,818
Patented July 28, 1970

3,521,818
CROP DUSTING MACHINE
Masick C. Magarian, 4481 N. Palm Ave.,
Fresno, Calif. 93704
Filed Mar. 7, 1968, Ser. No. 711,329
Int. Cl. A01n 17/08
U.S. Cl. 239—77                                    19 Claims

ABSTRACT OF THE DISCLOSURE

This invention is an agricultural dusting machine particularly adapted to dusting with sulphur and similar powdered chemicals on grapevines. The machine consists of a support frame with a supply hopper mounted on its upper portion and a blower unit with output nozzles which deliver a mixture of the dusting compound and air, mounted below the supply hopper. The support frame is carried by the implement supports of a normal vineyard tractor. The sulphur is delivered from the hopper to the nozzles where it is mixed with the air from the blower. The hopper has outlet ports which are controllable to regulate the supply of sulphur and a paddle mechanism and anti-clogging baffles to assure even flow through the ports. The hopper can be tilted with respect to the frame to dump any excess sulphur remaining after the dusting has been completed. Also, a metal duct is used between the blower and the nozzles which incorporates a durable flexible connection to permit movement of the nozzles, and the nozzles themselves have a combination of inner chambers to assure even distribution of the sulphur in the air stream.

---

This invention relates generally to devices for dusting agricultural crops, and more particularly to tractor carried dusting machines for vineyards.

With the increasing development of labor saving devices for agriculture, various types of dusting machines have been developed. Some of these machines have been sufficiently compact to be transported and powered from tractors commonly used in vineyard work. These tractor carried machines have gained considerable acceptance because of the convenience and economy which they provide. The presently known devices of this type have limitations, however, which impair their effectiveness. Particularly, the tractor carried dusting machines presently known fail to provide an even dispersion of the dusting compound in the air stream and adequate control of the supply of dusting compound. Also, they have exhibited an inability to avoid periodic clogging of the dusting compound in the supply container, and a need for relatively frequent and expensive maintenance. In addition, the presently known devices have not been as compact and inexpensive as desirable.

It is, therefore, a major object of my invention to provide an agricultural dusting machine which is transported and powered from tractors commonly used in vineyards and which provides a more consistent output mixture of dusting compound and air.

It is another object of my invention to provide an agricultural dusting machine of the type described which more effectively eliminates clogging of the dusting compound in the supply container and assures an even and manually controllable flow of dusting compound to the output nozzle.

It is a further object of my invention to provide an agricultural dusting machine of the type described which delivers output on both sides of a path of travel from a single blower and is simpler to operate and more compact.

It is yet another object of my invention to provide an agricultural dusting machine of the type described which substantially reduces the frequency and expense of maintenance, and is less expensive to manufacture.

It is still another object of my invention to provide an agricultural dusting machine of the type described in which the supply hopper containing the dusting compound may be tilted to unload any compound remaining after the dusting operation has been completed.

These and other objects and advantages of my invention will be more readily apparent from the following detailed description of a preferred embodiment of the invention and of the accompanying drawings in which:

FIG. 2 is a rear elevational view of the embodiment shown in FIG. 1;

FIG. 3 is a vertical transverse sectional view taken on line 3—3 in FIG. 1;

FIG. 4 is a horizontal transverse sectional view taken on line 4—4 in FIG. 2;

FIG. 5 is a partial sectional view taken on line 5—5 in FIG. 1; and

FIG. 6 is a partial sectional view taken on line 6—6 in FIG. 5.

Figure 1:
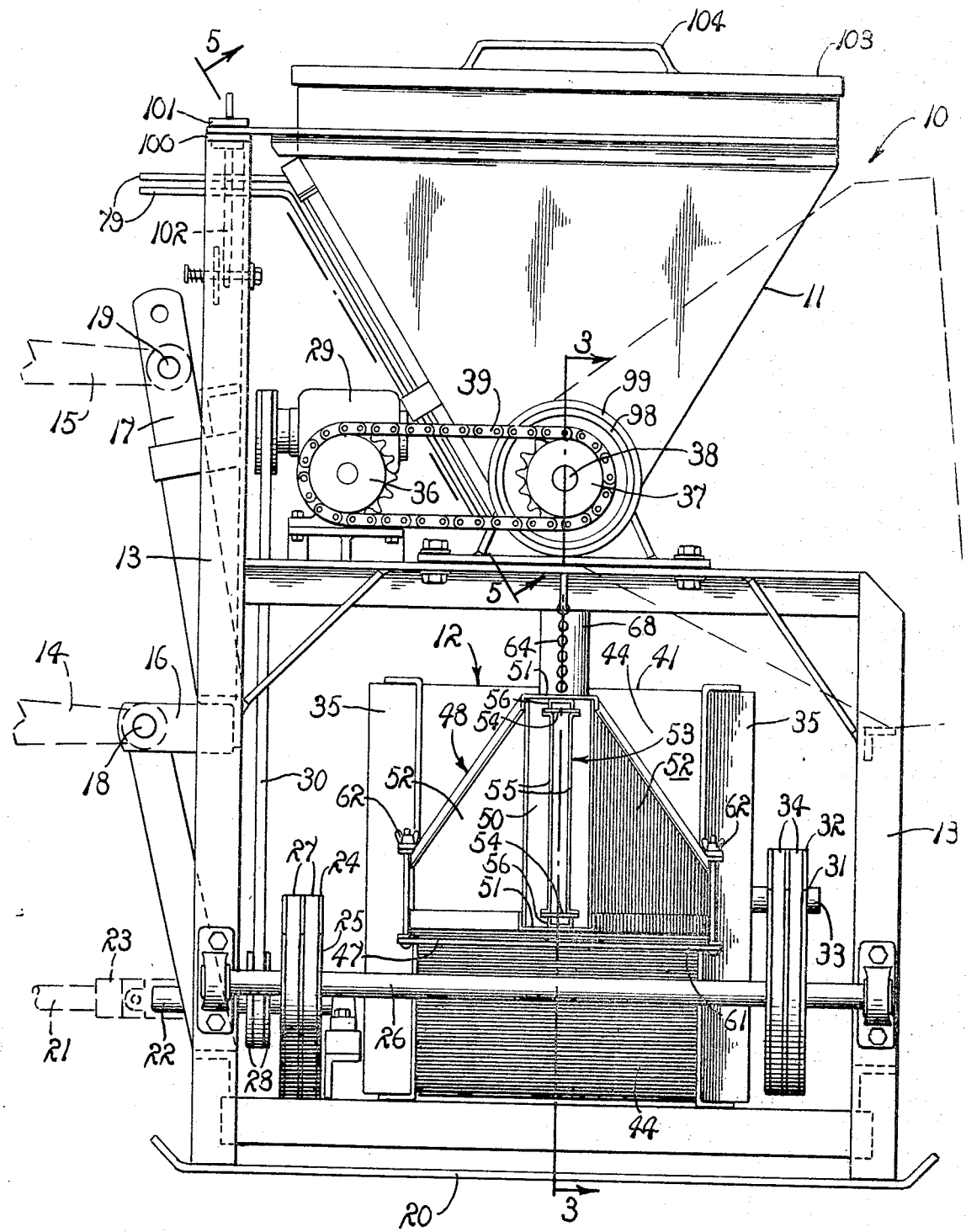
FIG. 1 is a side elevational view of a preferred embodiment of my invention.

Referring now to the drawings, and particularly FIG. 1 and 2 thereof, the numeral 10 designates generally a preferred embodiment of my agricultural dusting machine which has a supply hopper 11 disposed above a blower unit 12 on a structural frame 13.

The structural frame 13 is mounted to the implement support arms 14 and the pivot arm 15 of tractors commonly used in vineyards by means of lower mounting members 16 and upper mounting members 17. The lower mounting members 16 form a pivotal lower connection 18 with the tractor support arms 14 and the upper mounting members 17 form a pivotal upper connection 19 with the tractor pivot arm 15. Actuation to raise the implement support arms 14 thus lifts the dusting machine 10 into a transportable position on the implement support arms and pivot arm at the rear of the tractor in a manner well known in the art. Skids 20 are provided on the bottom of frame 13 to support the crop dusting machine 10 when it is not in use.

Power is supplied to the dusting machine 10 through the tractor power take-off shaft 21 by coupling the power take-off shaft 21 to a power input shaft 22 on the rear of the dusting machine through a universal coupling 23 (see FIG. 4). The power input shaft 22 is journaled to the frame 13 and carries a pair of power input pulleys 24. The power input pulleys 24 are drivingly connected to a pair of power transfer pulleys 25 on a power transfer shaft 26 by means of a pair of V-belts 27. The power transfer shaft 26 is journaled in the frame 13 on one side of the blower unit 12 and spans the frame longitudinally, The power input shaft 22 also carries a hopper drive pulley 28 which is drivingly connected to a hopper drive gear box 29 by means of a V-belt 30 (see FIGS. 1 and 2).

The power transfer shaft 26 also carries a pair of blower drive pulleys 31 at the opposite end from the power transfer pulleys 25, which are drivingly connected to a pair of blower shaft pulleys 32 on a blower shaft 33 by means of V-belts 34. The blower shaft 33 is disposed longitudinally in the approximate center of the support frame 13 and is journaled on a sub-frame 35 which supports the blower unit 12 (see FIG. 4).

The hopper drive gear box 29 has an output sprocket 36 which is drivingly connected to a paddle drive sprocket 37 on paddle unit drive shaft 38 by a drive chain 39. The paddle unit drive shaft 38 is disposed transversely of the support frame 13 and passes through, and is journaled in, the lower portion of the supply hopper 11.

It will thus be understood that the power from the tractor power take-off shaft 21 is delivered to the power input shaft 22 of the dusting machine 10 through the universal coupling 23. From the power input shaft 22, power is delivered to the power transfer shaft 26 by means of the power input pulleys 24 and power transfer pulleys 25 which are connected by the V-belts 27. From the power transfer shaft 26 power is delivered to the blower shaft 33 by means of the blower drive pulleys 31 and the blower shaft pulleys 32 which are connected by V-belts 34.

Power is delivered to the paddle unit drive shaft 38 through the hopper drive gear box 29 which is connected to the paddle unit drive shaft 38 by means of output sprocket 36, paddle drive sprocket 37 and drive chain 39. Power is delivered from the power input shaft 22 to the hopper drive gear box 29 by means of the hopper drive pulley 28 and V-belt 30.

As best shown in FIGS. 3 and 4, the blower unit 12 has a squirrel-cage type fan 40 mounted on the blower shaft 33 which is enclosed by a blower housing 41 with a pair of oppositely disposed transversely opening output shrouds 42 and a pair of oppositely disposed longitudinally opening input shrouds 43. The output shrouds 42 are extended transversely outward from the fan 40 to form blower output ducts 44. The blower output ducts 44 narrow at their outer ends to form duct throats 45. Just outward of the duct throats 45 the blower output ducts 44 are formed into a pair of oppositely disposed semi-cylindrical surfaces which constitute connecting necks 46. The connecting necks 46 cooperate to form a nozzle-duct coupling 47 as hereafter described more fully.

At the outer ends of blower output ducts 44, nozzles 48 are provided to direct the airstream and effect dispersion of the dusting compound into it. The nozzles 48 have an input neck 49 and an output port 50 formed by outwardly diverging top and bottom walls 51 and outwardly converging side walls 52. Inside the nozzles 48, a mixing chamber 53 is provided with outwardly diverging top and bottom walls 54 and outwardly converging side walls 55. The mixing chamber top and bottom walls 54 are disposed generally parallel to the nozzle top and bottom walls 51 and are secured in spaced relationship thereto by spacers 56. The mixing chamber side walls 55 have converged more rapidly than the nozzle side walls 52 so that the spacing between them is substantially less adjacent the output port 50 than at the input neck 49.

To provide an inlet for the dusting compound, cylindrical conduits 57 are formed in the nozzles 48 adjacent their input necks 49.

To provide an inlet for the dusting compound, cylindrical conduits 57 are formed in the nozzles 48 adjacent their input necks 49. The cylindrical conduits 57 pass through both the nozzle top walls 51 and the mixing chamber top walls 54, thus providing a path of communication from outside the nozzles directly to the mixing chambers 53. The cylindrical conduits 57 also project outwardly from the nozzle top walls 51 a sufficient distance to provide a conduit connecting flange 38 to which connecting hoses are attached as hereafter described. A deflector plate 59 is provided on the bottom wall 54 of the mixing chamber 53 just below the inner end of cylindrical conduit 57 to disperse incoming dusting compound about the mixing chamber.

The nozzles 48 are also provided with a pair of oppositely disposed semi-cylindrical connecting necks 60 which surround and contain the blower output duct connecting necks 46. The engaging surfaces of the connecting necks 46 and 60 nest together in this manner to permit pivotal movement of the nozzles 48 up and down with respect to the blower output ducts 44 and thus constitute the nozzle duct coupling 47.

To provide means for securing the nozzle duct coupling 47 in a particular position, a pair of transverse bars 61 are transversely disposed on each side of the nested connecting necks 46 and 60 with their ends extending beyond the ends of the coupling 47. The transverse bars 61 are held together by bolts and wing nuts 62 which are passed through their extending ends and thus form a releasable clamp 63. The clamp 63 secures the coupling 47 at a particular position in its range of pivotal movement when the bolts and wing nuts 62 are tightened to force the transverse bars into gripping engagement with the nested connecting necks 46 and 60 and releases the coupling 47 for pivotal movement when the bolts and wing nuts 62 are loosened to release the pressure of the transverse bars 61 on the nested connecting necks.

A safety chain 64 is also provided to prevent excessive movement of the nozzles 48 with respect to the frame 13.

To supply dusting compound from the supply hopper 11 to the nozzles 48, two output ports 65 are provided in the bottom of the hopper, one adjacent each side of the machine. Cylindrical flanges 66 are formed on the lower side of the supply hopper, each surrounding one of the output ports 65 and projecting downwardly therefrom. A plurality of radial holes 67 are provided in the upper portion of the cylindrical flanges 66 adjacent the bottom of the supply hopper to permit air to pass into the cylindrical flanges, and a pair of flexible hoses 68 are provided which connect the cylindrical flanges 66 to the conduit connecting flanges 58 of the conduits 57 on nozzles 48. The upper end of the flexible hoses 68 fits over the cylindrical flanges 64 but terminates short of the air inlet holes 65.

To regulate the amount of dusting compound passing through the output ports 65, a valve mechanism 69 is provided at the bottom of the supply hopper. The valve mechanism 69 consists of a pair of valve blades 70, each associated with one of the output ports 65. The valve blades 70 are disposed in radially directed passages 71 formed in the uppermost portions of the cylindrical flanges 66. The valve passages 71 snuggly receive the valve blades 70 which pass completely through the passages and are reciprocal therein. The output ports 65 are rectangular, and the valve blades 70 have matching rectangular valve ports 72 which are disposed adjacent the output valve ports 65 when the valve blades are inserted in the passages 71 (see FIGS. 3 and 6).

To operate the valve mechanisms 69, an operating linkage 73 is mounted on the lower portion of the supply hopper 11, the outer ends 74 of which are connected to inner ends 75 of the valve blades 70. The inner ends 75 of the operating linkage 73 are mounted in an elongated slide support 77 which supports the linkage for simultaneous reciprocating movement inwardly or outwardly as desired. Since the outer ends 74 of the linkage 73 are connected to the inner ends 75 of the valve blades 70, such inward and outward movement of the linkage causes the valve blades 70 to move inwardly and outwardly in the passages and causes the valve ports 72 to move with respect to the hopper output ports 65. The operating linkage 73 is so disposed in the slide support 77, that at its inwardmost position, valve blades 70 are disposed with respect to the output ports 65 so that the valve ports 72 are in exact alignment therewith. In the outwardmost position of the operating linkage 73, the valve blades 70 are so disposed with respect to the output ports 65 that the valve ports 72 are completely offset therefrom and the passage of dusting compound through the output ports 54 is blocked. At intermediate positions of the operating linkage, the valve blades 70 are positioned with respect to the output ports 65 so that varying portions of the valve ports 72 are aligned with the output ports 63 to vary the extent of the flow of dusting powder through the output ports 63.

To actuate the operating linkage 73 of the valve mechanism 69, coupling arms 78 are attached to the operating linkage and project at right angles therefrom. The coupling arms 78 are, in turn, each connected to the lower end of an operating handle 79 by variable coupling rods 80. The variable coupling rods 70 are each attached to their respective operating handle 79 at an equal distance from its pivotal mounting 81 so that equal movement of the operating handles 79 about their pivotal mounting 81 causes a substantially equal lateral movement of the coupling rods 80 and, in turn, the coupling arms 78, linkage 73 and valve blades 70.

To eliminate any play in the coupling rods 80, tension springs 82 are also connected between the coupling arms 78 and the lower end of handles 79, adjacent and parallel to the coupling rods. By variation of the length of the variable coupling rods 80, the position of the valve blades 70 on each side, can be adjusted so that each of the valve blades has exactly the same relationship to its associated output port 65 for any particular position of the operating handles 79.

To hold the handles 79 adjacent the supply hopper 11, a strap brace 84 is provided on the back of the hopper intermediate the length of the handles. The strap brace 83 has lock screws for securing the handles 79 in a particular position. At the upper ends of the handles 79, a scale 84 is provided to permit the operator to adjust the handle to certain predetermined settings. Since the handles 79 are connected individually, one to each of the valve blades 70, the handles can be moved in tandem to operate the valve blades 70 together or separately to move one valve blade to a different position than the other.

To assure a tight sliding relationship between the valve blades 70 and the output ports 65, a pair of compression springs 85 are disposed in housings 86 adjacent the cylindrical flanges 66. The compression springs 85 bear against the valve blades 70 and force them against the lower surface of the output ports 65.

To assure an even flow of dusting compound through the output ports 65 it is necessary to prevent packing and lumping of the dusting compound in the bottom of the supply hopper 11. For this purpose, a support screen 87 is disposed horizontally in the supply hopper 11 intermediate its depth. The support screen 87 engages all walls of the hopper at its point of placement and is supported by two shoulders 88 on the hopper side walls. The support screen 87 gives added support to dusting compound above it in the hopper and prevents the full weight of this compound from coming to bear on the dusting compound in the bottom of the hopper (see FIG. 3).

To assure that the dusting compound in the bottom of the supply hopper 11 adjacent the output ports 65 is not packed or lumped, a pair of mixing wheels 89 are provided adjacent each of the output ports. The mixing wheels 89 have a plurality of fingers 80 which project outwardly to form a generally cone shaped periphery.

The mixing wheels 89 are formed integral with an elongated housing 91, one wheel being disposed at each end. The mixing wheel housing 91 and mixing wheels 89 are split longitudinally into two generally identical housing halves 92 which are bolted into an assembly on the paddle unit drive shaft 38. The paddle unit drive shaft 38 is rotatably mounted in the lower portion of the supply hopper 11 by means of two end bearings 93 carried in bearing housings 94 bolted and sealed about oppositely disposed openings 95 in the sides of the hopper. By reason of this structure, the paddle unit drive shaft 38 can be easily removed from the hopper 11 by disassembly of the mixing wheels housing 91 into the housing halves 92 and removal of the end bearings 93 and housings 94 from the openings 95.

As the fingers 90 on the mixing wheels 89 rotate they pass in close proximity to the output ports 65. Above the output ports 65 at a distance just sufficient to pass the fingers 90, baffles 96, which are mounted on the walls of the hopper project into the path of flow of the dusting compound to the output ports. The baffles 96 are contoured to mate with the contour of the fingers 90 so that a scissoring action occurs as the fingers pass beneath the baffles, and above the output ports. The baffles 96 also support the weight of dusting compound immediately above the output ports 65 to prevent packing of the dusting compound at the output ports.

As additional protection against packing or lumping of the dusting compound in the bottom of the supply hopper 11, paddle rods 97 are provided which extend between the mixing wheels 89 on each side of the hopper. As the mixing wheels 89 are rotated by the paddle unit driveshaft 38, the paddle rods 97 cut through dusting compound adjacent the paddle unit driveshaft to keep it well granulated.

The supply hopper 11 is pivotally mounted in the frame 13 adjacent the journaled ends of the paddle unit driveshaft 38 by means of cylindrical drums 98. The drums 98 are housed in cylindrical cavities 99 on the frame member 13 and are rotatable with respect thereto. By reason of this mounting, the supply hopper 11 may be pivotally displaced from its normal upright position through a 90° arc to a dump position. This facilitates the unloading of dusting compound from the supply hopper when a dusting operation has been completed.

To lock the supply hopper 11 in its normal upright position, locking lugs 100 are provided on the rear side portions of the hopper which cooperate with frame lugs 101 and turn bolts 102 to releasably lock the hopper to the frame. The supply hopper 11 is manually releasable from the frame to permit its pivotal movement for dumping by loosening the turn bolt 102 and removing it from the lugs 100 and 101.

To eliminate unwanted debris, a cover 103 is provided which has a handle 104 for easy manual removal.

OPERATION

The operation of my machine is substantially as follows. The dusting machine 10 is mounted to a tractor by first connecting the lower mounting members 16 to the implement support arms 14, and then connecting the upper mounting members 17 to the implement pivot arm 15. The tractor power is then actuated to lift the dusting machine from the ground and place it in operating position on the tractor. The supply hopper 11 is loaded with dusting compound and covered by hopper cover 103. The tractor power output shaft 21 is connected to the power input shaft 22 by universal coupling 23 to deliver power to the dusting machine, and the tractor is aligned with a vineyard row. The delivered power causes rotation of the blower fan 40 and the paddle unit drive shaft 38 through the various shafts, pulleys, sprockets and chains described. The operation of the blower fan 40 creates an airstream through the blower output ducts 44 and out of the nozzles 48. The operator then feeds dusting compound into the airstream from the supply hopper 11 by regulating the handles 79 which in turn moves the valve blades 70 to open hopper output ports 65 to a point sufficient to permit passage of the desired amount of dusting compound. Clogging or lumping of the dusting compound in the bottom of the hopper and adjacent the output ports 65 is prevented by the support screen 87, paddle rods 97, baffles 96 and the wheels 89 with their projecting fingers 90 in the manner previously described.

As dusting compound flows by gravity outward through the output ports 65, it passes down the hoses 68 and cylindrical conduit 57 into the mixing chamber 53 of the nozzles 48. The radial holes 67 in the cylindrical flanges 66 admit air into the upper ends of the hoses 68 to prevent the development of a vacuum in the hoses and assure the uninterrupted flow of dusting compound from the hopper to the nozzle. As the dusting compound reaches the nozzles 48 and passes into the mixing chambers 53 through the cylindrical conduits 57, it strikes the deflector plates 59 and is dispersed about the mixing chambers. The dusting compound is then carried by the air stream out of the output ports 50 of the nozzles to the vines.

By reason of the interrelationship of the nozzle top and bottom walls 51 and side walls 52, and the mixing chamber top and bottom walls 54 and side walls 55, the air stream passing through the nozzle is divided. A portion of the air stream passes through the mixing chamber and the balance passes around the mixing chamber. The portion of the air stream passing through the mixing chamber 53 enters through a horizontally disposed, rectangular port, passes below the cylindrical conduit 57 and about the deflector plate 59 where it mixes with the dusting compound, and then exits through a vertically disposed rectangular port of greater area than the entry port. The balance of the air stream, on the other hand, enters the nozzle through a larger horizontally disposed rectangular port, passes around the outside of the mixing chamber 53, and exits through a vertically disposed, rectangular port of substantially the same area as the entry port, where it meets the air stream exiting from the mixing chamber. The resultant air flow patterns have been found to provide an excellent dispersion of the dusting compound in the air stream, provided the flow of dusting compound to the nozzles is sufficiently even and granular.

The direction of the air stream is regulated by releasing the clamps 63, adjusting the nozzle duct couplings 47 to position the nozzles at the desired angle, and then securing the clamps again.

When adjustment of the amount of dusting compound in the air stream is desired, the operator manually repositions the handles 79 of the valve mechanisms 69.

When the dusting operation is completed, the dusting machine has been shut down, any remaining dusting compound is unloaded from the supply hopper 11 by removing the hopper cover 103, releasing the turn bolts 102, securing lugs 100 and 101 and manually tilting the hopper to its dump position.

From this detailed description of a preferred embodiment of my invention, it will be understood that not only have I provided a tractor mounted crop dusting machine which covers both sides of a vineyard row from a single blower fan, but I have substantially improved the quality of the dusting by assuring an even flow of dusting compound to the nozzles and a more uniform dispersion of the compound in the air stream. Furthermore, I have provided air stream ducts which permit convenient adjustment of the nozzle positions, and yet avoid the use of flexible hose which is costly and requires frequent replacement. Also, convenient access may be achieved to the paddle unit driveshaft 38 and mixing wheels 89 for repair or replacement, by disassembly of the mixing wheel housing 91 and removal of the end bearings 93 and their housings 94, as described.

From this description it will also be understood that I have provided a crop dusting machine which is capable of attaining the objects and achieving the advantages heretofore attributed to it.

I claim:
1. A crop dusting machine comprising:
   a support frame;
   a dusting compound supply container having a top opening therein pivotally mounted in said support frame and disposed for pivotal movement from a normal upright position with said top opening directed upward to a dump position with said top opening directed downward;
   mounting means on said support frame for attachment to the implement arms of a vineyard tractor;
   a blower rotatably mounted on said support frame and disposed to deliver an air stream transverse to the path of travel of said dusting machine;
   power input means on said support frame interconnected with said blower for receiving power from a tractor;
   a pair of output nozzles mounted one on each side of said support frame adjacent said blower;
   means defining a pair of blower output ducts each interconnected between said blower and one of said nozzles;
   a pair of pivotal couplings each operatively associated with one of said blower output ducts and nozzles and disposed to permit pivotal movement of said nozzle up and down with respect to said duct;
   a pair of output ports disposed in the lower portion of said supply container;
   a valve means operatively associated with said output ports and manually operable to regulate the flow of dusting compound therethrough;
   a pair of flexible conduits each interconnecting one of said supply container output ports to one of said nozzles; and
   anti-clocking means operatively associated with said supply container and said supply container output ports and drivingly connected to said power input means to effect granularization and even flow of dusting compound through said supply container output ports and said conduits, said anti-clogging means including support screen disposed horizontally in said supply container intermediate the depth thereof, paddle means revolvingly mounted in the lower portion of said supply container, and coacting baffle and finger means disposed adjacent to said supply container output ports.

2. A crop dusting machine of the type described in claim 1 which includes:
   releasable lock means operatively associated with said supply container and said support frame and disposed to releasably lock said supply container to said support frame to secure said supply container in its normal upright position.

3. A crop dusting machine of the type described in claim 1 in which:
   said paddle means includes a shaft rotatably mounted in the bottom of said supply container and disposed transversely with respect to said support frame;
   means defining two oppositely disposed openings in the bottom of said supply container for accommodating the outer ends of said shaft;
   a pair of end bearings each disposed on one end of said shaft;
   a pair of bearing housings each removably mounted to the periphery of said oppositely disposed openings and disposed to contain one of said bearings for rotatably mounting the ends of said shaft in said openings;
   an elongated cylindrical paddle shaft having a pair of mixing wheels mounted on each end thereof, said housing and mixing wheels being longitudinally split into two substantially identical sections and removably mounted on said shaft intermediate the ends thereof with each of said mixing wheels disposed adjacent one of said supply container output ports;
   finger members mounted on said mixing wheels and projecting radially therefrom to form a generally cone shaped periphery, said finger members being disposed to pass in close proximity with said supply container output port adjacent said mixing wheel when said shaft is rotated; and
   a pair of baffles each mounted in said supply container adjacent one of said supply container ports and in spaced relationship therefrom, each of said baffles being contoured to cooperate with said finger members in scissor relationship when said fingers are rotated past said output port as aforesaid.

4. A crop dusting machine of the type described in claim 1 in which said dusting compound supply container includes:
   a V-shaped hopper with an open top, a front and rear wall each of which taper downwardly to integrally join a narrow bottom wall, and V-shaped side panels integrally attached to the front, rear and bottom walls to complete the hopper;

a pair of cylindrical drums mounted on the side panels of said hopper adjacent their junction with the bottom wall thereof; and a pair of cylindrical cavities mounted on said support frame adjacent said cylindrical drums and disposed to receive said drums and rotatably contain the same.

5. A crop dusting machine of the type described in claim 1 in which said pair of pivotal couplings includes:

a first pair of spaced, oppositely disposed, semi-cylindrical surfaces formed integrally with the outermost end of each of said blower output ducts with their axis disposed transverse to the longitudinal axis of said ducts;

a second pair of spaced, oppositely disposed, semi-cylindrical surfaces formed integrally with the innermost end of each of said nozzles with their axis disposed transverse to the longitudinal axis of said nozzles, and said second pair of surfaces being disposed to contain said first pair of surfaces in nested engagement for pivot movement thereon; and releasable clamp means for securing said second pair of surfaces at a particular position with respect to said first pair of surfaces.

6. A crop dusting machine comprising:
a support frame;
a dusting compound supply container disposed on said support frame;
blower means disposed on said support frame;
nozzle means disposed on said support frame;
duct means disposed to interconnect said blower means and said nozzle means, said duct means including a pair of oppositely disposed converging fluid ducts interconnected between said blower means and said nozzle means, a pair of pivotal couplings each operatively associated with one of said fluid ducts and having a first pair of spaced semi-cylindrical surfaces transversely disposed with respect to said fluid ducts and a second pair of spaced semi-cylindrical surfaces transversely disposed with respect to said fluid ducts, said second semi-cylindrical surfaces being nested in said first semi-cylindrical surfaces, and clamp means operatively associated with said pivotal coupling and disposed to clamp said nested semi-cylindrical surfaces in a fixed position, relative to one another; and
conduit means disposed to interconnect said supply container and said nozzle means.

7. A crop dusting machine comprising:
a support frame;
a dusting compound supply container disposed on said support frame, said supply container having an opening therein for receiving dusting compound and being pivotally mounted in said support frame and disposed for pivotal movement thereon from a normal upright position with said opening directed upward to a dump position with said opening directed downward;
releasable lock means disposed to lock said supply container to said support frame when said supply container is in its normal upright position;
blower means disposed on said support frame;
nozzle means disposed on said support frame;
duct means disposed to interconnect said blower means and said nozzle means; and
conduit means disposed to interconnect said supply container and said nozzle means.

8. A crop dusting machine comprising:
a support frame;
a dusting compound supply container disposed on said support frame and having a V-shaped hopper with an open top, a front and rear wall each of which taper downwardly to integrally join a narrow bottom wall, and V-shaped side panels integrally attached to the front, rear and bottom walls to complete the hopper;

a pair of cylindrical drums mounted on the side panels of said hopper adjacent their junction with the bottom wall thereof;

a pair of cylindrical cavities mounted on said support frame adjacent said cylindrical drums and disposed to receive said drums and rotatably contain the same;

a pair of hopper lugs mounted on the side panels of said hopper adjacent their junction with the top and rear walls and disposed to project outward therefrom;

a pair of frame lugs mounted on said support frame and disposed to engage said hopper lugs when said hopper is positioned in said frame with said open top directed upwardly;

a pair of turn bolts pivotally mounted in said support frame adjacent said frame lugs and disposed to pivot into securing engagement with said hopper lugs and said frame lugs to clamp said lugs together in their engaged position;

blower means disposed on said support frame;
nozzle means disposed on said support frame;
duct means disposed to interconnect said blower means and said nozzle means; and
conduit means disposed to interconnect said supply container and said nozzle means.

9. A crop dusting machine comprising:
a support frame;
a dusting compound supply container disposed on said support frame;
an output port in the lower portion of said supply container;
a paddle shaft rotatably mounted in the lower portion of said supply container;
a mixing wheel mounted on said paddle shaft and having finger means projecting outwardly therefrom, said mixing wheel being so disposed that said finger means are brought into close relationship with said output port upon rotation of said paddle shaft;
paddle rods connected between said mixing wheels and disposed substantially parallel to said paddle shaft in radially spaced relationship therefrom;
a baffle mounted in the lower portion of said supply hopper in spaced relationship to said output port, to define a slot through which said finger means pass, said baffle being contoured to mate with said finger means in scissors relationship upon passage of said finger means through said slot;
blower means disposed on said support frame;
nozzle means disposed on said support frame;
duct means disposed to interconnect said blower means and said nozzle means; and
conduit means disposed to interconnect said supply container and said nozzle means.

10. A crop dusting machine comprising:
a support frame;
a dusting compound supply container disposed on said support frame;
blower means disposed on said support frame;
nozzle means disposed on said support frame;
duct means disposed to interconnect said blower means and said nozzle means;
a pair of output ports disposed in the bottom of said supply container;
a pair of conduit connecting flanges mounted on the bottom of said supply container and disposed to surround said output ports;
slot passages disposed radially through said conduit connecting flanges juxtaposed said output ports;
a pair of valve blades each slidingly disposed in one of said slot passages for reciprocal movements with respect to said conduit connecting flanges, said valve blades having valve ports therein disposed to align with said output ports when said valve blades are slid to a predetermined position in said slot passages;

manually operable linkage means connected to each of said valve blades for either simultaneous or separate reciprocation thereof in said slot passages; and a pair of flexible hoses, each interconnected between one of said conduit connecting flanges and said nozzle means.

11. A crop dusting machine comprising:

a support frame;

a dusting compound supply container disposed on said support frame;

blower means disposed on said support frame, said blower means including a fan centrally disposed in said support frame, and a housing having two oppositely disposed output ports;

nozzle means disposed on said support frame, said nozzle means including a pair of nozzle housings each having an entrance port and an exit port, and a mixing chamber disposed in each of said nozzle housings in spaced relationship thereto, said mixing chamber having an entrance port and an exit port;

duct means disposed to interconnect said blower means and said nozzle means, said duct means including a pair of oppositely disposed converging fluid ducts each attached to said fan housing output ports and extending outwardly therefrom with respect to said support frame to a point adjacent said nozzle means, and a pair of pivotal couplings each operatively associated with one of said fluid ducts and having a pair of spaced semi-cylindrical surfaces transversely disposed with respect to said fluid ducts and a second pair of semi-cylindrical surfaces transversely disposed with respect to said fluid ducts, said second semi-cylindrical surfaces being nested in said first semi-cylindrical surfaces for pivotal movement with respect thereto, and said pivotal couplings each being connected to one of said nozzle housings; and conduit means disposed to interconnect said supply container and said nozzle means.

12. A crop dusting machine comprising:

a support frame;

a dusting compound supply container disposed on said support frame;

blower means disposed on said support frame;

nozzle means disposed on said support frame;

conduit means disposed to interconnect said supply container and said nozzle means; and duct means disposed to interconnect said blower means and said nozzle means, said duct means including a fluid duct interconnected between said blower means and said nozzle means, and a pivotal coupling operatively associated with said fluid duct and having a pair of spaced semi-cylindrical surfaces transversely disposed with respect to said fluid duct and a second pair of spaced semi-cylindrical surfaces transversely disposed with respect to said fluid duct, said second semi-cylindrical surfaces being nested in said first semi-cylindrical surfaces, and releasable securing means disposed to secure said nested semi-cylindrical surfaces in a fixed position relative to one another.

13. A crop dusting machine comprising:

a support frame;

nozzle means mounted on said support frame and disposed to deliver a dust laden air stream to portions of a crop;

blower means mounted on said support frame and interconnected with said nozzle means, said blower means being drivable to deliver an air stream to said nozzle;

a dusting compound supply container having an output port disposed to deliver dusting compound to said nozzle for dispersement into said air stream;

finger means movably mounted in said dusting compound supply container and disposed to pass in close proximity to said supply container output port upon movement thereof;

baffle means mounted in said supply container in spaced relationship from said output port, said baffle member being spaced from said output port a distance sufficiently greater than the thickness of said finger means to permit passage of said finger means between said baffle means and said output port in a scissor-like relationship upon movement of said finger means; and drive means drivingly interconnected with said blower means and said finger means.

14. A crop dusting machine as described in claim 13 in which:

said finger means include a plurality of finger members rotatably mounted in said supply container, each being disposed to pass in close proximity to said supply container output port upon rotation thereof;

said baffle means include a baffle member fixedly mounted in said supply container in spaced relationship from said output port; and said finger members and said baffle member have coacting surfaces thereon disposed and contoured to cooperate in scissor-like relationship upon passage of each of said finger members between said baffle member and said output port.

15. A crop dusting machine as described in claim 14 which further includes:

an agitator rotatably mounted in said dusting compound supply container adjacent an output port, said agitator being interconnected with said finger members for movement therewith.

16. A crop dusting machine comprising:

a support frame;

nozzle means mounted on said support frame and disposed to deliver a dust laden air stream to portions of a crop;

blower means mounted on said support frame and interconnected with said nozzle means, said blower means being disposed upon actuation to deliver an air stream to said nozzle;

a dusting compound supply container having an output port disposed to deliver dusting compound to said nozzle for dispersement into said air stream;

means defining a slot juxtaposed the entrance of said output port and disposed normal to the axis of said output port;

a valve blade slidingly disposed in said slot for reciprocal movement therein and disposed to regulate the passage of dusting compound from said supply container through said output port; and operable linkage means connected to said valve blade and disposed to reciprocally position said valve blade in said slot and output port upon operation thereof.

17. A crop dusting machine comprising:

a support frame;

nozzle means mounted on said support frame, said nozzle means having an inlet and an outlet;

a mixing chamber disposed in said nozzle means, said mixing chamber having an input port disposed in fluid communication with the inlet of said nozzle means, and an output port disposed in fluid communication with the outlet of said nozzle means, and a dusting compound input port;

blower means disposed on said support frame and drivable to produce an air stream;

duct means interconnecting said blower means and the inlet of said nozzle means, and disposed to direct said air stream to said nozzle means;

a dusting compound supply container disposed on said support frame; and conduit means interconnecting said dust compound supply container and said dust compound inlet of said mixing chamber and disposed to feed dusting compound by gravity flow from said supply container to said mixing chamber.

18. A crop dusting machine as described in claim 17 in which:

said nozzle means includes a nozzle interconnected by said duct means to said blower means and having a mixing chamber mounted therein and disposed to provide a mixing passage through said mixing chamber and a nozzle passage through said nozzle outside said mixing chamber, said nozzle passage having an output area less than its input area and said mixing passage having an output area greater than its input area and positioned adjacent the output area of said nozzle passage, thereby creating by venturi effect a low pressure area at said mixing passage output area.

19. A crop dusting machine as described in claim 18 which further includes:

a deflector disposed in said mixing chamber in alignment with and in spaced relationship from said dusting compound input port and disposed to deflect and initially disperse said dusting compound in said mixing chamber.

References Cited

UNITED STATES PATENTS

| | | | |
|---|---|---|---|
| 2,226,136 | 12/1940 | Parker | 239—77 |
| 2,940,209 | 6/1960 | Funk | 239—78 |
| 2,975,543 | 3/1961 | Funk | 222—173 |
| 3,263,360 | 8/1966 | Patterson | 239—78 |
| 3,339,846 | 9/1967 | Guetet | 239—77 |

FOREIGN PATENTS

| | | |
|---|---|---|
| 913,520 | 6/1954 | Germany. |

EVERETT W. KIRBY, Primary Examiner

U.S. Cl. X.R.

222—173